United States Patent
Geyzel et al.

(10) Patent No.: US 8,135,168 B2
(45) Date of Patent: Mar. 13, 2012

(54) SYSTEM FOR EMBEDDING DATA

(75) Inventors: Zeev Geyzel, Alon Shvut (IL); Leonid Dorrendorf, Adumim (IL)

(73) Assignee: NDS Limited, Middlesex (GB)

( * ) Notice: Subject to any disclaimer, the term of this patent is extended or adjusted under 35 U.S.C. 154(b) by 232 days.

(21) Appl. No.: 12/521,083

(22) PCT Filed: Jan. 13, 2008

(86) PCT No.: PCT/IB2008/050104
§ 371 (c)(1),
(2), (4) Date: Feb. 25, 2010

(87) PCT Pub. No.: WO2008/096281
PCT Pub. Date: Aug. 14, 2008

(65) Prior Publication Data
US 2010/0146284 A1 Jun. 10, 2010

(30) Foreign Application Priority Data

Feb. 5, 2007 (IL) .......................... 181167
Jun. 11, 2007 (IL) .......................... 183841

(51) Int. Cl.
*G06K 9/00* (2006.01)
(52) U.S. Cl. ......... 382/100; 382/232; 382/233; 382/173
(58) Field of Classification Search .......... 382/100, 382/232, 173, 276, 305, 308, 200, 239, 281, 382/284; 713/176; 345/589, 530, 213; 705/75; 283/13
See application file for complete search history.

(56) References Cited

U.S. PATENT DOCUMENTS

| | | | |
|---|---|---|---|
| 5,960,081 A | 9/1999 | Vynee et al. | |
| 7,289,643 B2 * | 10/2007 | Brunk et al. | 382/100 |
| 7,930,546 B2 * | 4/2011 | Rhoads et al. | 713/176 |
| 2003/0021439 A1 * | 1/2003 | Lubin et al. | 382/100 |
| 2003/0206179 A1 * | 11/2003 | Deering | 345/589 |
| 2008/0130883 A1 * | 6/2008 | Agaian et al. | 380/54 |
| 2009/0089587 A1 * | 4/2009 | Brunk et al. | 713/176 |

FOREIGN PATENT DOCUMENTS

WO 01/35323 A 5/2001

OTHER PUBLICATIONS

Chinese Office Action Dated May 25, 2011 With Translation.
Alastair Reed et al.; "Adaptive Color Watermarking"; vol. 4675; Jan. 1, 2002; pp. 222-229; XP002399582.

* cited by examiner

*Primary Examiner* — Samir Ahmed
*Assistant Examiner* — Ali Bayat
(74) *Attorney, Agent, or Firm* — Ladas & Parry LLP

(57) ABSTRACT

A method and system for embedding data in video frames is described, the method comprising receiving marking information, representing the marking information as a 2-coordinate vector, denoted $\bar{\omega}$, where the 2-coordinates are denoted, respectively, $\alpha$, $\beta$, such that $\bar{\omega}=(\alpha, \beta)$, providing a video frame to be marked, the video frame including a plurality of pixels, each pixel of the plurality of pixels being represented as p, where p=(x, y), x and y including coordinates of pixel p, the plurality of pixels being represented as a triad of color elements, denoted, respectively, as R, G, and B, and marking the video frame by transforming each pixel among the plurality of pixels as follows $R'(p)=R(p)+R>$, $G'(p)=G(p)+G>$, and $B'(p)=B(p)+B>$, where R> represents a dot product operation on p and $\bar{\omega}R$, G> represents a dot product operation on p and $\bar{\omega}G$, and B> represents a dot product operation on p and $\bar{\omega}B$.

26 Claims, 8 Drawing Sheets

FIG. 7

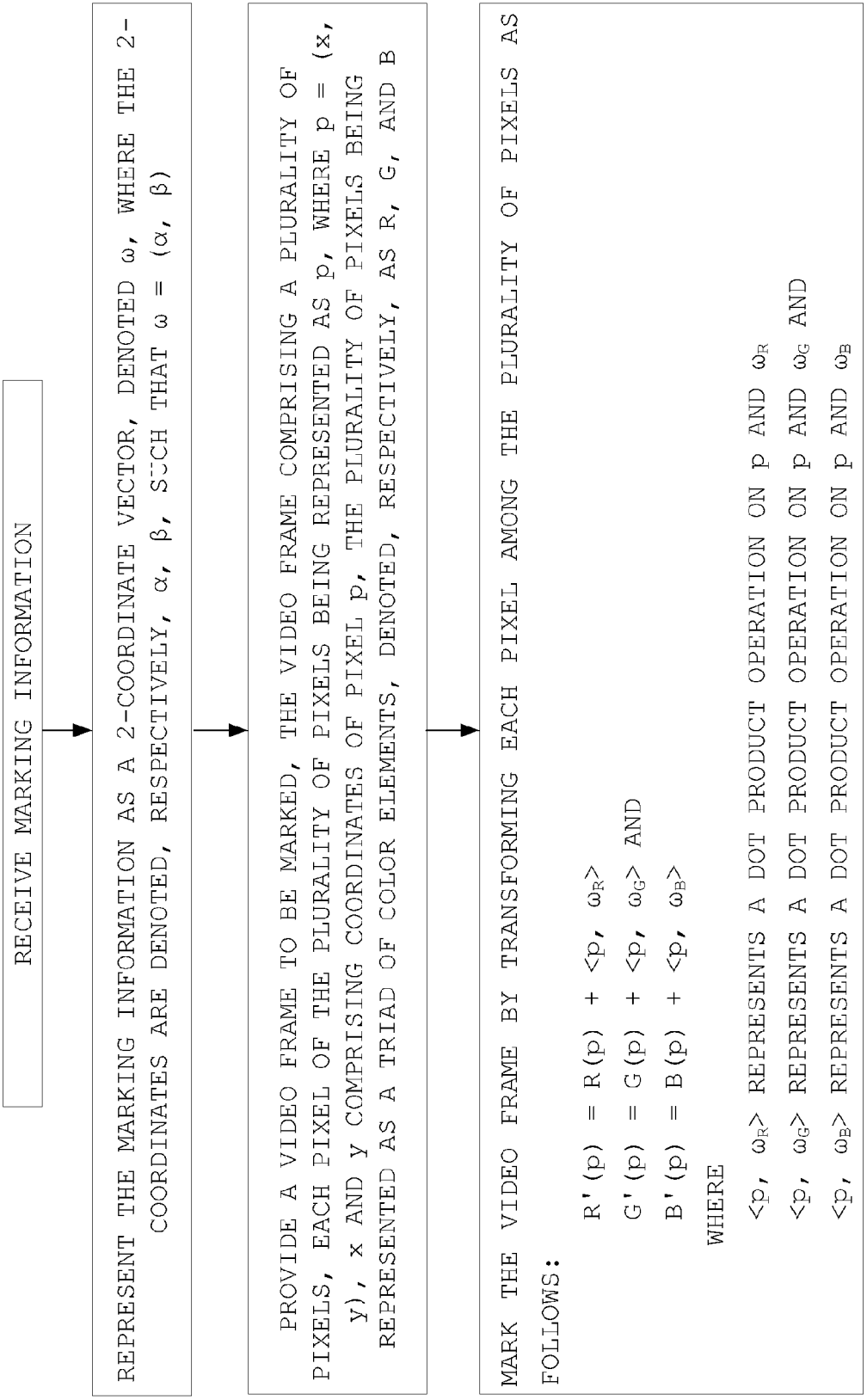

RECEIVE MARKING INFORMATION

↓

REPRESENT THE MARKING INFORMATION AS A 2-COORDINATE VECTOR, DENOTED ω, WHERE THE 2-COORDINATES ARE DENOTED, RESPECTIVELY, α, β, SUCH THAT ω = (α, β)

↓

PROVIDE A VIDEO FRAME TO BE MARKED, THE VIDEO FRAME COMPRISING A PLURALITY OF PIXELS, EACH PIXEL OF THE PLURALITY OF PIXELS BEING REPRESENTED AS p, WHERE p = (x, y), x AND y COMPRISING COORDINATES OF PIXEL p, THE PLURALITY OF PIXELS BEING REPRESENTED AS A TRIAD OF COLOR ELEMENTS, DENOTED, RESPECTIVELY, AS R, G, AND B

↓

MARK THE VIDEO FRAME BY TRANSFORMING EACH PIXEL AMONG THE PLURALITY OF PIXELS AS FOLLOWS:

R'(p) = R(p) + ⟨p, ω_R⟩
G'(p) = G(p) + ⟨p, ω_G⟩ AND
B'(p) = B(p) + ⟨p, ω_B⟩

WHERE
⟨p, ω_R⟩ REPRESENTS A DOT PRODUCT OPERATION ON p AND ω_R
⟨p, ω_G⟩ REPRESENTS A DOT PRODUCT OPERATION ON p AND ω_G AND
⟨p, ω_B⟩ REPRESENTS A DOT PRODUCT OPERATION ON p AND ω_B

SYSTEM FOR EMBEDDING DATA

The present application is a 35 USC §371 application of PCT/IB2007/050104, filed on 13 Jan. 2008 and entitled "System for Embedding Data", which was published in the English language with International Publication Number WO 2008/096281, and which claims the benefit of priority from IL Patent Application IL 181167 of NDS Limited, filed 5 Feb. 2007, and the benefit of priority from IL Patent Application IL 183841 of NDS Limited, filed 11 Jun. 2007.

FIELD OF THE INVENTION

The present invention relates to data embedding systems, and particularly to data embedding systems using unique identification as input.

BACKGROUND OF THE INVENTION

With the recent advances in Internet content distribution, including peer-to-peer networks and real-time video streaming systems, in order to prevent unauthorized distribution of content, it becomes important to embed data in video to trace the point of distribution. The point of distribution is often an authorized viewer, such as a cinema where pirated copies are made with camcorders, or a set-top-box TV decoder whose output is captured and re-encoded into a video file. After tracing the source, measures can be taken to prevent further unauthorized distribution.

Embedding signals in video is a rich field both in academic research and commercial inventions. Covert watermarking in the compressed (MPEG) domain is well known in the art, as are overt watermarks that appear as bitmaps on top of the video, and steganographic watermarks.

Digital Watermarking of Visual Data: State of the Art and New Trends, by M. Barni, F. Bartolini and A. Piva., Congrès Signal processing X: Theories and Applications (Tampere, 4-8 Sep. 2000), EUPSICO 2000: European Signal Processing Conference No 10, Tampere, Finland (Apr. 9, 2000), briefly reviews the state of the art in digital watermarking of visual data. A communication perspective is adopted to identify the main issues in digital watermarking and to present the most common solutions adopted by the research community. The authors first consider the various approaches to watermark embedding and hiding. The communication channel is then taken into account, and the main research trends in attack modeling are overviewed. Particular attention is paid to watermark recovery due to the impact it has on the final reliability of the whole watermarking system.

Multichannel Watermarking of Color Images, by M. Barni, F. Bartolini and A. Piva., published in IEEE Transactions on Circuits and Systems for Video Technology, Vol. 12, No. 3, March 2002, describes that in the field of image watermarking, research has been mainly focused on grayscale image watermarking, whereas the extension to the color case is usually accomplished by marking the image luminance, or by processing each color channel separately. In this paper, a DCT domain watermarking technique expressly designed to exploit the peculiarities of color images is presented. The watermark is hidden within the data by modifying a subset of full-frame DCT coefficients of each color channel. Detection is based on a global correlation measure which is computed by taking into account the information conveyed by the three color channels as well as their interdependency. To ultimately decide whether or not the image contains the watermark, the correlation value is compared to a threshold. With respect to existing grayscale algorithms, a new approach to threshold selection is proposed, which permits reducing the probability of missed detection to a minimum, while ensuring a given false detection probability. Experimental results, as well as theoretical analysis, are presented to demonstrate the validity of the new approach with respect to algorithms operating on image luminance only.

Digital Watermarking for 3D Polygons using Multiresolution Wavelet Decomposition, by Satoshi Kanai, Hiroaki Date, and Takeshi Kishinami, available on the World Wide Web at citeseer.ist.psu.edu/504450.html, describes that recently much interest is being taken in methods to protect the copyright of digital data and preventing illegal duplication of it. However, in the area of CAD/CAM and CG, there are no effective ways to protect the copyright of 3D geometric models. As a first step to solve this problem, a new digital watermarking method for 3D polygonal models is introduced in this paper. Watermarking is one of the copyright protection methods where an invisible watermark is secretly embedded into the original data. The proposed watermarking method is based on wavelet transform (WT) and multiresolution representation (MRR) of the polygonal model. The watermark can be embedded in the large wavelet coefficient vectors at various resolution levels of the MRR. This makes the embedded watermark imperceptible and invariant to the affine transformation. And also makes the control of the geometric error caused by the watermarking reliable. First the requirements and features of the proposed watermarking method are discussed. Second the mathematical formulations of WT and MRR of the polygonal model are shown. Third the algorithm of embedding and extracting the watermark is proposed. Finally, the effectiveness of the proposed watermarking method is shown through several simulation results.

U.S. Pat. No. 7,068,809 of Stach describes a method wherein segmentation techniques are used in methods for embedding and detecting digital watermarks in multimedia signals, such as images, video and audio. A digital watermark embedder segments a media signal into arbitrary shaped regions based on a signal characteristic, such as a similarity measure, texture measure, shape measure or luminance or other color value extrema measure. The attributes of these regions are then used to adapt an auxiliary signal such that it is more effectively hidden in the media signal. In one example implementation, the segmentation process takes advantage of a human perceptibility model to group samples of a media signal into contiguous regions based on their similarities. Attributes of the region, such as its frequency characteristics, are then adapted to the frequency characteristics of a desired watermark signal. One embedding method adjusts a feature of the region to embed elements of an auxiliary signal, such as an error correction encoded message signal. The detecting method re-computes the segmentation, calculates the same features, and maps the feature values to symbols to reconstruct an estimate of the auxiliary signal. The auxiliary signal is then demodulated or decoded to recover the message using error correction decoding/demodulation operations.

U.S. Pat. No. 6,950,532 of Schumann et al. describes a visual copyright protection system, the visual copyright protection system including input content, a disruption processor, and output content. The disruption processor inserts disruptive content to the input content creating output content that impedes the ability of optical recording devices to make useful copies of output content.

Patent Abstracts of Japan for JP11075055 describes a method wherein secret information is embedded into a luminance signal, and the position information of the secret information is embedded into a corresponding color signal. An M system being one of pseudo random numbers (PN systems) is used for a method for embedding the secret information. A picture signal is divided as the block of N pixel values, and a pseudo random number of length N is added. This operation is executed to each block of an input picture signal so that a picture signal into which secret information is embedded can be constituted. The pseudo random number is overlapped on the position of a color signal corresponding to the position at which the secret signal is embedded into the luminance signal. Each scanning line of the color signal is divided into the blocks constituted of the N picture elements, and the pseudo random number of the length N is overlapped. Correlation is calculated for decoding.

US Patent Application 20020027612 of Brill, et al. describes a method for adding a watermark to a video signal representing an image, the method comprising the steps of applying a first watermark function to a first set of pixels in a first frame, and applying a complement of the first watermark function to a second set of pixels in the first frame.

U.S. Pat. No. 5,832,119 of Rhoads describes a method whereby an embedded multi-bit signal is steganographically detected from empirical data, such as image or audio data, and some aspect of a related system's operation is controlled in accordance therewith. One application of the invention is a video playback or recording device that is controlled in accordance with the embedded multi-bit signal to limit playback or recording operations. Another is a photo-duplication kiosk that recognizes certain steganographic markings in an image being copied and interrupts the copying operation.

The following references are also believed to reflect the present state of the art:
U.S. Pat. No. 6,760,463 to Rhoads;
U.S. Pat. No. 6,721,440 to Reed et al.;
U.S. Pat. No. 5,636,292 to Rhoads;
U.S. Pat. No. 5,768,426 to Rhoads;
U.S. Pat. No. 5,745,604 to Rhoads;
U.S. Pat. No. 6,404,898 to Rhoads;
U.S. Pat. No. 7,058,697 to Rhoads;
U.S. Pat. No. 5,832,119 to Rhoads;
U.S. Pat. No. 5,710,834 to Rhoads;
U.S. Pat. No. 7,020,304 to Alattar et al.;
U.S. Pat. No. 7,068,809 to Stach;
U.S. Pat. No. 6,381,341 to Rhoads;
U.S. Pat. No. 6,950,532 to Schumann, et al.;
U.S. Pat. No. 7,035,427 to Rhoads; and
WO 02/07362 of Digimarc Corp.

The disclosures of all references mentioned above and throughout the present specification, as well as the disclosures of all references mentioned in those references, are hereby incorporated herein by reference.

SUMMARY OF THE INVENTION

The present invention seeks to provide an improved system and method for embedding data in a target, the target including, but not limited to digital video. Accordingly, during embedding of the data, every pixel of every frame in which data is to be embedded has a mathematical transformation applied to a triad of three color components (R, G, B) of the pixel, based on pixel position on-screen and input information. Input information comprises, for example and without limiting the generality of the foregoing, an owner's unique ID, encoded as a two-dimensional vector. During detection of embedded information, color component values of pixels in every frame comprising embedded data frame are summed, producing a color mass evaluation. By comparing the evaluation with an expected result, the embedded information can be extracted using an equation.

There is thus provided in accordance with a preferred embodiment of the present invention a method including receiving marking information, representing the marking information as a 2-coordinate vector, denoted $\omega$, where the 2-coordinates are denoted, respectively, $\alpha$, $\beta$, such that $\omega=(\alpha, \beta)$, providing a video frame to be marked, the video frame including a plurality of pixels, each pixel of the plurality of pixels being represented as p, where p=(x, y), x and y including coordinates of pixel p, the plurality of pixels being represented as a triad of color elements, denoted, respectively, as R, G, and B, and marking the video frame by transforming each pixel among the plurality of pixels as follows $R'(p)=R(p)+<p, \omega_R>$, $G'(p)=G(p)+<p, \omega_G>$, and $B'(p)=B(p)+<p, \omega_B>$, where $<p, \omega_R>$ represents a dot product operation on p and $\omega_R$, $<p, \omega_G>$ represents a dot product operation on p and $\omega_G$, and $<p, \omega_B>$ represents a dot product operation on p and $\omega_B$.

Further in accordance with a preferred embodiment of the present invention the marking information includes information identifying a rendering device.

Still further in accordance with a preferred embodiment of the present invention the information identifying a rendering device includes a unique device identifier.

Additionally in accordance with a preferred embodiment of the present invention the marking information includes a copyright mark.

Moreover in accordance with a preferred embodiment of the present invention the marking information includes access rights data.

Further in accordance with a preferred embodiment of the present invention the access rights data include playback/copying permission.

Still further in accordance with a preferred embodiment of the present invention the at least one color element includes a Red-Green-Blue color element.

Additionally in accordance with a preferred embodiment of the present invention the at least one color element includes a chrominance/luminance color element.

Moreover in accordance with a preferred embodiment of the present invention the chrominance/luminance color element includes a YCbCr chrominance/luminance color element.

Further in accordance with a preferred embodiment of the present invention the chrominance/luminance color element includes a YPbPr chrominance/luminance color element.

Still further in accordance with a preferred embodiment of the present invention the chrominance/luminance color element includes a YDbDr chrominance/luminance color element.

Additionally in accordance with a preferred embodiment of the present invention the chrominance/luminance color element includes a xvYCC chrominance/luminance color element.

Moreover in accordance with a preferred embodiment of the present invention R'(p), G'(p), and B'(p) do not exceed a maximum value allowed for each the color element in a color representation system.

Further in accordance with a preferred embodiment of the present invention any of R'(p), G'(p), and B'(p) are truncated to ensure that any of R'(p), G'(p), and B'(p) do not exceed the maximum value.

Still further in accordance with a preferred embodiment of the present invention the color representation system includes a Red-Green-Blue color representation system.

Additionally in accordance with a preferred embodiment of the present invention the color representation system includes a chrominance/luminance color representation system.

Moreover in accordance with a preferred embodiment of the present invention R'(p), G'(p), and B'(p) do not fall below a minimum value allowed for each the color element in a color representation system.

Further in accordance with a preferred embodiment of the present invention any of R'(p), G'(p), and B'(p) are truncated to ensure that any of R'(p), G'(p), and B'(p) do not exceed the minimum value.

Still further in accordance with a preferred embodiment of the present invention the color representation system includes a Red-Green-Blue color representation system.

Additionally in accordance with a preferred embodiment of the present invention the color representation system includes a chrominance/luminance color representation system.

Moreover in accordance with a preferred embodiment of the present invention the representing the marking information as a 2-coordinate vector includes expressing the marking information as a string of bits, subdividing the string of bits into a plurality of sub-strings of bits, and translating the each one of the plurality of sub-strings of bits into a corresponding 2-coordinate vector.

Further in accordance with a preferred embodiment of the present invention each one of the plurality of sub-strings of bits includes a three bit string of bits.

Still further in accordance with a preferred embodiment of the present invention each one of the plurality of sub-strings of bits includes a two bit string of bits.

There is also provided in accordance with another preferred embodiment of the present invention a method including capturing a video stream including embedded data, segmenting the video stream into a plurality of video frames included therein, locating a color mass, denoted C', for each color element of every individual video frame of the plurality of video frames by summing color value coordinates for a given color element included in the individual video frame, locating a color mass, denoted C, for each color element of a corresponding individual video frame, the corresponding individual video frame corresponding a video frame which does not include embedded data, subtracting C from C', and deriving, from a result of the subtraction, a value of a first coordinate and a second coordinate, the first coordinate and the second coordinate including coordinates of a vector, the vector corresponding to a string of bits, the string of bits including information embedded in the individual video frame.

Further in accordance with a preferred embodiment of the present invention marking information is reconstructed as a result of the deriving the value of a first coordinate and a second coordinate.

Still further in accordance with a preferred embodiment of the present invention an individual user ID is recognized as a result of reconstructing the marking information.

There is also provided in accordance with still another preferred embodiment of the present invention a system including a marking information receiver, a 2-coordinate vector, denoted $\omega$, where the 2-coordinates are denoted, respectively, $\alpha$, $\beta$, such that $\omega=(\alpha, \beta)$, the 2-coordinate vector representing the marking information, a video frame to be marked, the video frame including a plurality of pixels, each pixel of the plurality of pixels being represented as p, where $p=(x, y)$, x and y including coordinates of pixel p, the plurality of pixels being represented as a triad of color elements, denoted, respectively, as R, G, and B, and a video frame marker operative to mark the video frame by transforming each pixel among the plurality of pixels as follows $R'(p)=R(p)+<p, \omega_R>$, $G'(p)=G(p)+<p, \omega_G>$, and $B'(p)=B(p)+<p, \omega_B>$, where $<p, \omega_R>$ represents a dot product operation on p and $\omega_R$, $<p, \omega_G>$ represents a dot product operation on p and $\omega_G$, and $<p, \omega_B>$ represents a dot product operation on p and $\omega_B$.

There is also provided in accordance with still another preferred embodiment of the present invention a system including a captured video stream including embedded data, a video stream segmenter operative to segment the captured video stream into a plurality of video frames included therein, a first color mass locator, operative to locate a first color mass, the first color mass denoted C', for each color element of every individual video frame of the plurality of video frames by summing color value coordinates for a given color element included in the individual video frame, a second color mass locator, operative to locate a second color mass, the second color mass denoted C, for each color element of a corresponding individual video frame, the corresponding individual video frame corresponding a video frame which does not include embedded data, a processor operative to subtract C from C', and a second processor operative to derive, from a result of the subtraction, a value of a first coordinate and a second coordinate, the first coordinate and the second coordinate including coordinates of a vector, the vector corresponding to a string of bits, the string of bits including information embedded in the individual video frame.

There is also provided in accordance with still another preferred embodiment of the present invention a signal including a video stream including a plurality of video frames, each of the plurality of video frames including a plurality of pixels, each pixel of the plurality of pixels being represented as p, where $p=(x, y)$, x and y including coordinates of pixel p, the plurality of pixels being represented as a triad of color elements, denoted, respectively, as R, G, and B, wherein marking information has been utilized to transform each pixel among the plurality of pixels, the marking information represented as a 2-coordinate vector, denoted $\omega$, where the 2-coordinates are denoted, respectively, $\alpha$, $\beta$, such that $\omega=(\alpha, \beta)$, as follows $R'(p)=R(p)+<p, \omega_R>$, $G'(p)=G(p)+<p, \omega_G>$, and $B'(p)=B(p)+<p, \omega_B>$, where $<p, \omega_R>$ represents a dot product operation on p and $\omega_R$, $<p, \omega_G>$ represents a dot product operation on p and $\omega_G$ and $<p, \omega_B>$ represents a dot product operation on p and $\omega_B$.

There is also provided in accordance with still another preferred embodiment of the present invention a storage medium including a video stream including a plurality of video frames, each of the plurality of video frames including a plurality of pixels, each pixel of the plurality of pixels being represented as p, where $p=(x, y)$, x and y including coordinates of pixel p, the plurality of pixels being represented as a triad of color elements, denoted, respectively, as R, G, and B, wherein marking information has been utilized to transform each pixel among the plurality of pixels, the marking information represented as a 2-coordinate vector, denoted $\omega$, where the 2-coordinates are denoted, respectively, $\alpha$, $\beta$, such that $\omega=(\alpha, \beta)$, as follows $R'(p)=R(p)+<p, \omega_R>$, $G'(p)=G(p)+<p, \omega_G>$ and $B'(p)=B(p)+<p, \omega_B>$, where $<p, \omega_R>$ represents a dot product operation on p and $\omega_R$, $<p, \omega_G>$ represents a dot product operation on p and $\omega_G$, and $<p, \omega_B>$ represents a dot product operation on p and $\omega_B$.

BRIEF DESCRIPTION OF THE DRAWINGS

The present invention will be understood and appreciated more fully from the following detailed description, taken in conjunction with the drawings in which:

FIGS. 7 and 8 are simplified flowcharts of preferred methods of operation of the system of FIG. 1.

DETAILED DESCRIPTION OF A PREFERRED EMBODIMENT

Figure 1:
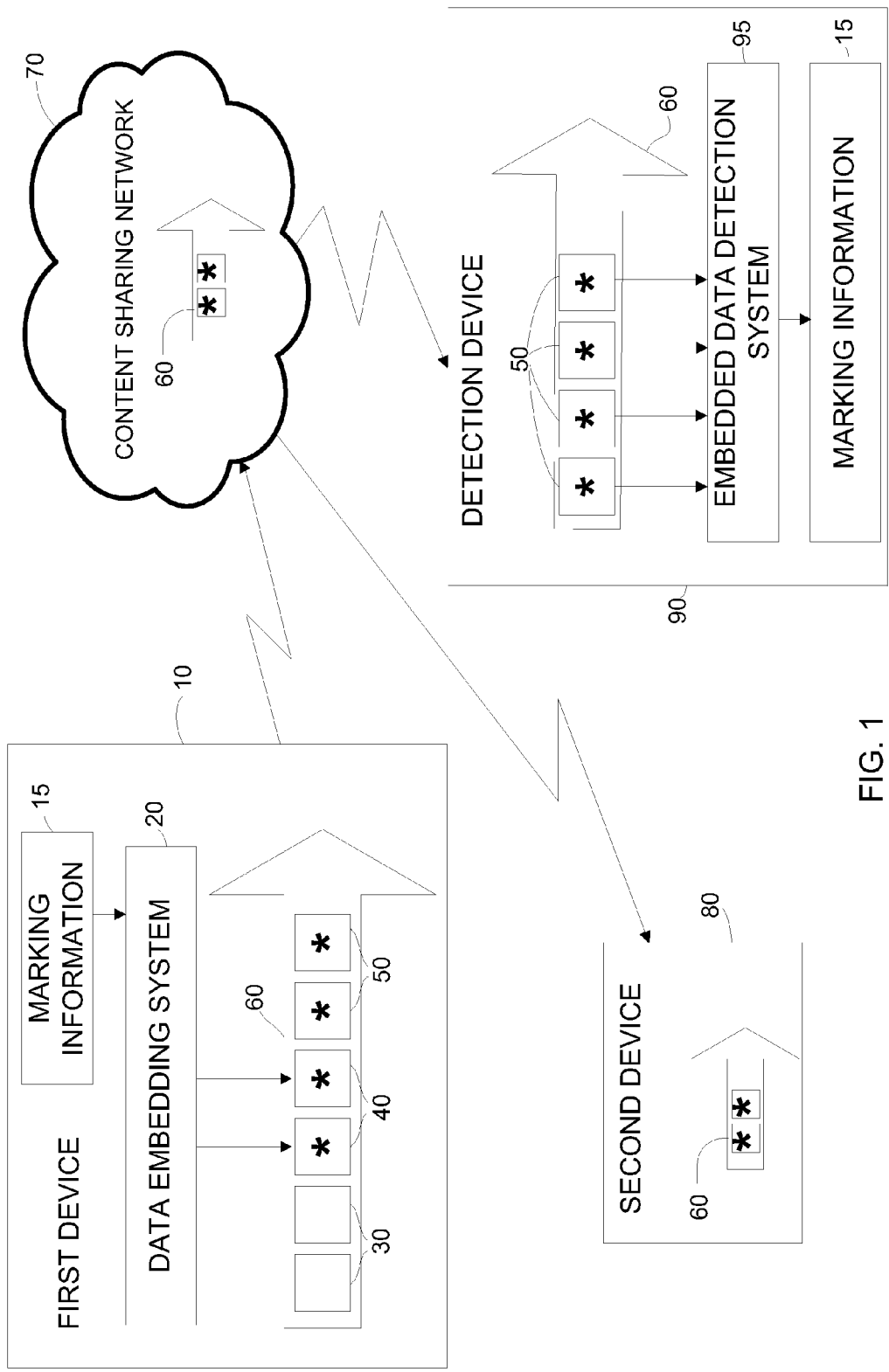
FIG. 1 is a simplified block drawing of a video data embedding system constructed and operative in accordance with a preferred embodiment of the present invention.

Reference is now made to FIG. 1, which is a simplified block drawing of a video data embedding system constructed and operative in accordance with a preferred embodiment of the present invention. The system of FIG. 1 comprises a content rendering device 10. The content rendering device 10 preferably comprises marking information 15 and a data embedding system 20.

The marking information 15 preferably comprises any appropriate information, for example and without limiting the generality of the foregoing, information identifying the rendering device 10, and preferably a unique device ID for the content rendering device 10. Alternatively and preferably, a copyright mark or other access rights data, for example and without limiting the generality of the foregoing, the playback/copying permissions to be obeyed by the content rendering device 10. Those skilled in the art will appreciate that copyright information may, for example and without limiting the generality of the foregoing, be a single bit, indicating copyrighted/not copyrighted. Alternatively, copyright may be indicated in a plurality of bits, such as, and without limiting the generality of the foregoing, permission to copy but not to burn to CD. It is assumed that authorized playback devices respect such signals, while unauthorized playback devices are assumed not to respect such signals. It is appreciated that combinations of appropriate types of identifying information may alternatively be used as the marking information 15.

The data embedding system 20 is preferably operative to inject embedded data, depicted in FIG. 1 as an asterisk, *, onto frames 30, 40, 50 of a video stream 60.

The operation of the system of FIG. 1 is now described. The video stream 60 is depicted as comprising three distinct types of video frames:
frames not yet comprising embedded data 30;
frames presently being embedded with data 40; and
frames already embedded with data 50.

The data embedding system 20 preferably receives the marking information 15 as an input, generates the embedded data, depicted as an asterisk, *, and injects a watermark (termed herein "WM") into the frames presently being embedded with data 40.

Content comprising the video stream 60, now comprising a plurality of frames already embedded with data 50, may be uploaded or otherwise made available on a content sharing network 70. The content sharing network 70 typically comprises a either a streaming content sharing network or a peer-to-peer content sharing network. Alternatively, the content sharing network 70 may comprise any appropriate type of online and/or offline content distribution scheme, for example and without limiting the generality of the foregoing, retail sale of pirated DVDs. A second device 80 may then acquire the video stream 60 from the content sharing network 70.

A broadcaster, a content owner, or other appropriately authorized agent may also acquire the video stream 60 from the content sharing network 70. Upon acquisition of the video stream 60 from the content sharing network 70 by the broadcaster, content owner, or other interested stakeholder, the video stream 60 is preferably input into a detection device 90. The detection device 90 preferably extracts the embedded data, depicted as an asterisk, *, from each of the frames already embedded with data 50 comprised in the video stream 60. The extracted embedded data is then input into an embedded data detection system 95. The embedded data detection system 95 preferably is able to determine the injected marking information 15 from the input embedded data.

Figure 2:
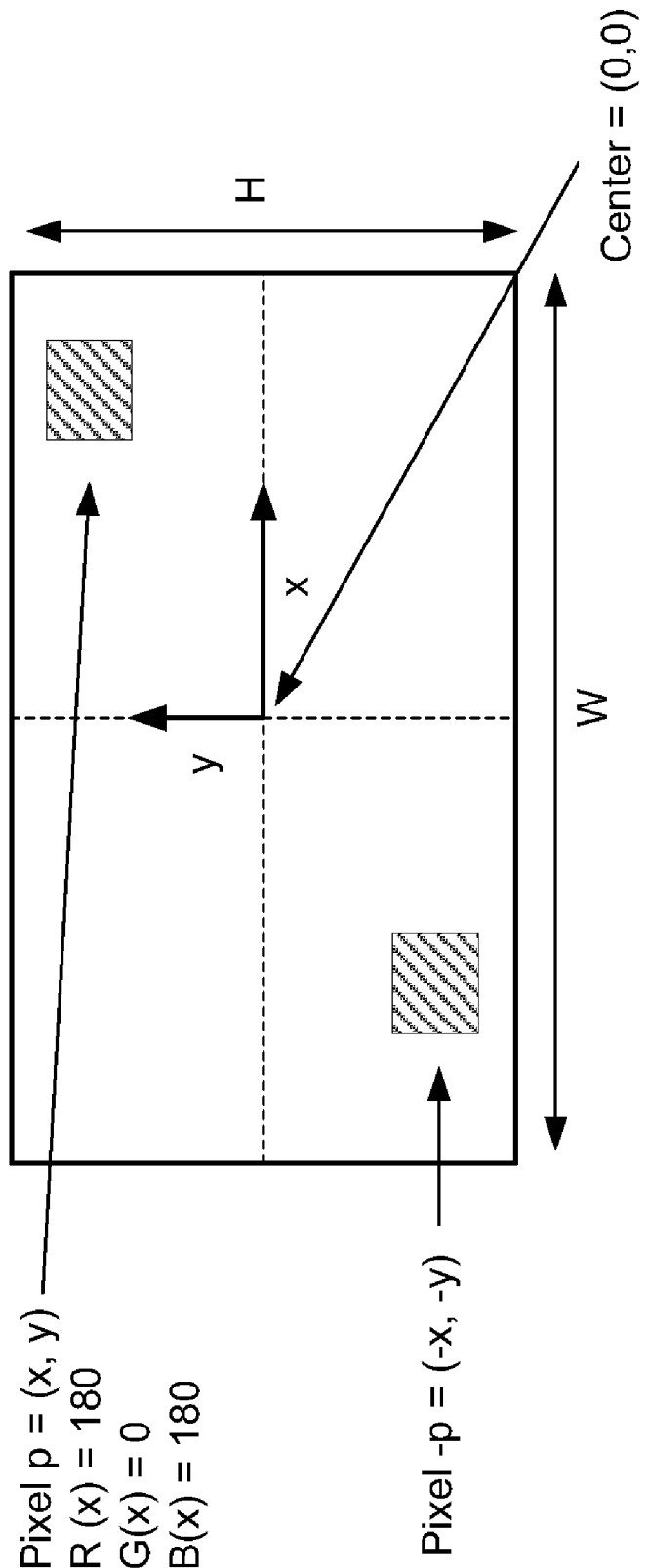
FIG. 2 is a simplified drawing of a typical frame into which data is to be embedded, within the system of FIG. 1.

Reference is now made to FIG. 2, which is a simplified drawing of a typical frame into which data is to be embedded, within the system of FIG. 1. Those skilled in the art will appreciate that every frame into which data is to be embedded comprises a plurality of pixels. Each of the plurality of pixels may be represented a comprising a tuple representative of a group of color elements in the pixel. For example and without limiting the generality of the foregoing, in a red, green, blue color system (hereinafter R, G, B, where R stands for red, G stands for green, and B stands for blue. Whether taken collectively or individually), each of the plurality of pixels may be represented as comprising a value between 0 and 255.

Those skilled in the art will appreciate that pixel color may alternatively be expressed in any appropriate color space, such as any of the well known Chrominance/Luminance systems (for instance, YCbCr; YPbPr; YDbDr), or according to the xvYCC standard, IEC 61966-2-4. For simplicity of discussion, pixel color is expressed herein, in a non-limiting manner, as a RGB triplet.

The term "inject", in all of its grammatical forms, as used herein, is used interchangeably with the term "embed", in all of its grammatical forms.

The following notation, of which certain portions are depicted, for illustrative purposes, in FIG. 2, is used in the discussion below, as well as in the claims:

W frame width in pixels

H frame height in pixels $p=(x, y)$ a pixel's position relative to center. E.g. the top-left pixel is $(-W/2, -H/2)$.

$R(p), G(p), B(p)$ pixel p's original red, green, blue component $R'(p), G'(p), B'(p)$ pixel p's red, green, blue component after data embedding $R^* = \Sigma R(p)$ The sum of $R(p)$ for every pixel p in a frame. Similarly for G, $G^* = \Sigma G(p)$, and for B, $B^* = \Sigma B(p)$. For simplicity of discussion, further examples are limited to the R component.

$\omega = (\alpha, \beta)$ Information to inject, represented as a 2-coordinate vector. As mentioned above, with reference to FIG. 1, the information to inject is preferably dependent on some appropriate information, preferably information identifying the rendering device 10 (FIG. 1), and preferably a unique device ID for the content rendering device 10 (FIG. 1).

<A, B>=Σ($A_i$*$B_i$) Dot product operation on vectors A and B.

Figure 3:
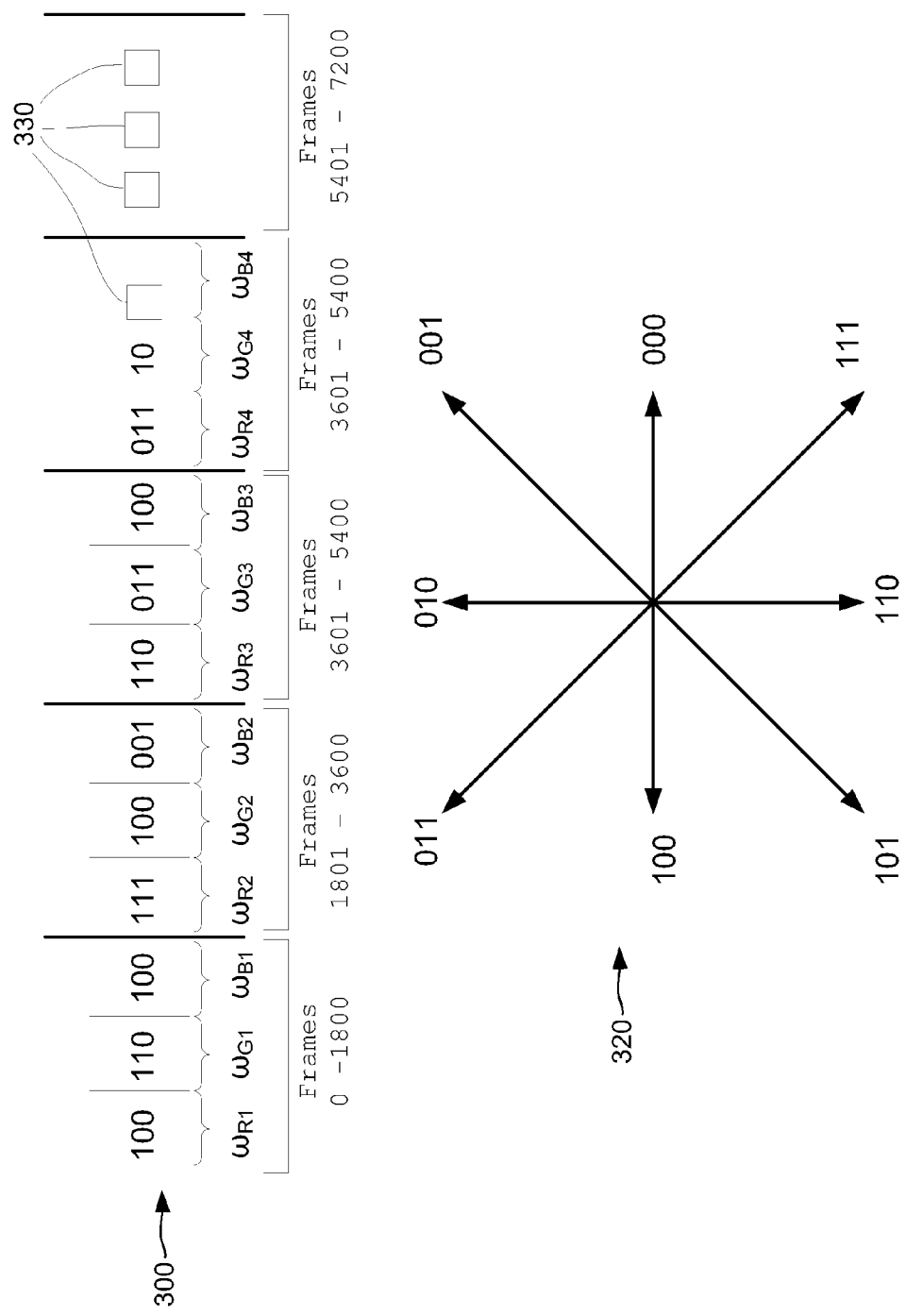
FIG. 3 is a depiction of one preferred embodiment of a method of injecting marking information in the typical frame of FIG. 2.
Figure 4:
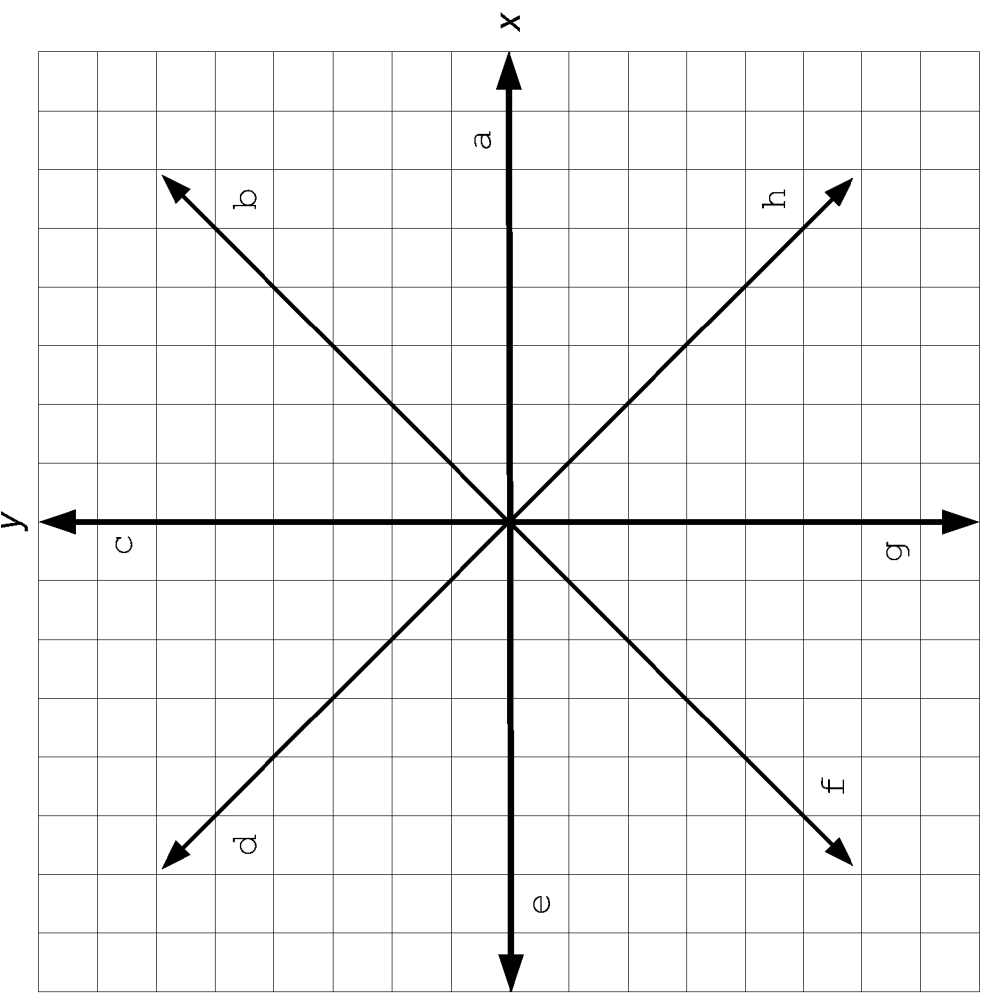
FIG. 4 is a depiction of the typical frame of FIG. 2 overlaid with eight vectors.

Reference is now made to FIGS. 3 and 4. FIG. 3 is a depiction of one preferred embodiment of a method of injecting marking information 15 (FIG. 1) in the typical frame of FIG. 2. FIG. 4 is a depiction of the typical frame of FIG. 2 overlaid with eight vectors. As described above, with reference to FIG. 1, the marking information 15 (FIG. 1) preferably comprises any appropriate information, for example and without limiting the generality of the foregoing, information identifying the rendering device 10 (FIG. 1), and preferably a unique device ID for the content rendering device 10 (FIG. 1). In FIG. 3, the marking information 300 is expressed, for the sake of the present non-limiting example, as an arbitrarily chosen 32-bit number.

The marking information 300 is shown divided into sets of 3-bit triplets. Each of the sets of 3-bit triplets is depicted associated with a particular 2-coordinate vector, ω. Specifically:

| Bits | Bit Values | Associated ω | Frame |
|---|---|---|---|
| 0-2 | 100 | $ω_{R1}$ | 0-1800 |
| 3-5 | 110 | $ω_{G1}$ | |
| 6-8 | 100 | $ω_{B1}$ | |
| 9-11 | 111 | $ω_{R2}$ | 1801-3600 |
| 12-14 | 100 | $ω_{G2}$ | |
| 15-17 | 001 | $ω_{B2}$ | |
| 18-20 | 110 | $ω_{R3}$ | 3601-5400 |
| 21-23 | 011 | $ω_{G3}$ | |
| 24-26 | 100 | $ω_{B3}$ | |
| 27-29 | 011 | $ω_{R4}$ | 5401-7200 |
| 30-31 | 10- | $ω_{G4}$ | |

Each 3-bit triplet is associated with one of the eight vectors, a-h, depicted in FIG. 4. One preferred scheme matrix of viewers by products 320 of associating each of the 3-bit triplets is depicted at the bottom of FIG. 3. Specifically:

| Vector | Bit Value |
|---|---|
| a | 000 |
| b | 001 |
| c | 010 |
| d | 011 |
| e | 100 |
| f | 101 |
| g | 110 |
| h | 111 |

It is appreciated that the method of division of identifying information into groups of three bits is arbitrary, and any appropriate alternative method of division is valid.

It is appreciated that vectors a-h are arbitrarily determined, and any alternative set of vectors applied such that the alternative set of vectors have an origin at a viewing screen center is a valid set of vectors for use in a preferred embodiment of the present invention.

It is appreciated that the associations of bit values with vectors is arbitrary, and any alternative scheme is valid. For example and without limiting the generality of the foregoing, the following table depicts an alternative association of each of the 3-bit triplets with vectors:

| Vector | Bit Value |
|---|---|
| a | 111 |
| b | 110 |
| c | 101 |
| d | 100 |
| e | 011 |
| f | 010 |
| g | 001 |
| h | 000 |

It is appreciated that the depiction of the marking information 300 in FIG. 3 is depicted as a 32-bit number, nevertheless, either a 33-bit number or a 36-bit number is required in order to have a full set of vectors $ω_{R3}$, $ω_{G3}$, $ω_{B3}$, and possibly $ω_{R4}$, $ω_{G4}$, $ω_{B4}$. A lack of required bits is indicated in FIG. 3 by the presence of empty boxes 330. In order to have a complete set of either 33-bits or 36-bits, either one or four stuffing bits must be added to the 32-bit marking information 300, using techniques well know in the art. For example and without limiting the generality of the foregoing, a 4-bit check sum can be added as stuffing bits, the last 4 bits can be repeated as stuffing bits, an arbitrary sequence of 4 bits (e.g. any of 0000, 0101, 1010, or 1111) can be added as stuffing bits, thereby rounding out the 32-bit marking information 300 to 36-bits. Similar techniques can be used to round out the 32-bit marking information 300 to 33-bits.

Each set of three vectors, $ω_{Rn}$, $ω_{Gn}$, $ω_{Bn}$ is preferably utilized to embed data as described below, for a limited number of frames. For example and without limiting the generality of the foregoing, in the example depicted in FIGS. 3 and 4, $ω_{R2}$, $ω_{G2}$, $ω_{B2}$ are used to embed data in frames 1801-3600.

After all of the 33-bits or 36-bits are used in embedding data one set of frames, the marking information 300 is repeated.

The marking information 15 (FIG. 1) is preferably encoded as three 2-dimensional vectors $ω_R$, $ω_G$, $ω_B$, over the set of real numbers, subject to limitations discussed below.

To inject data $ω_R$, $ω_G$, $ω_B$, transform every pixel p in a frame as follows:

$R'(p)=R(p)+<p,ω_R>$;

$G'(p)=G(p)+<p,ω_G>$; and $B'(p)=B(p)+<p,ω_B>$.

It is appreciated that the values of R, G, and B can never exceed the maximum imposed by the video color representation system, regardless of the values of R'(p), G'(p), and B'(p). For example and without limiting the generality of the foregoing, in systems of RGB values between 0 and 255, R, G, and B can never go above a maximum of 255. Likewise, the value of R, G, and B can never go below a minimum of 0, regardless of the values of R'(p), G'(p), and B'(p). For example and without limiting the generality of the foregoing, if G'(p)=258, then G'(p) is clipped to 255. Likewise, if B'(p)=−2, then B'(p) is raised to 0.

Figure 5:
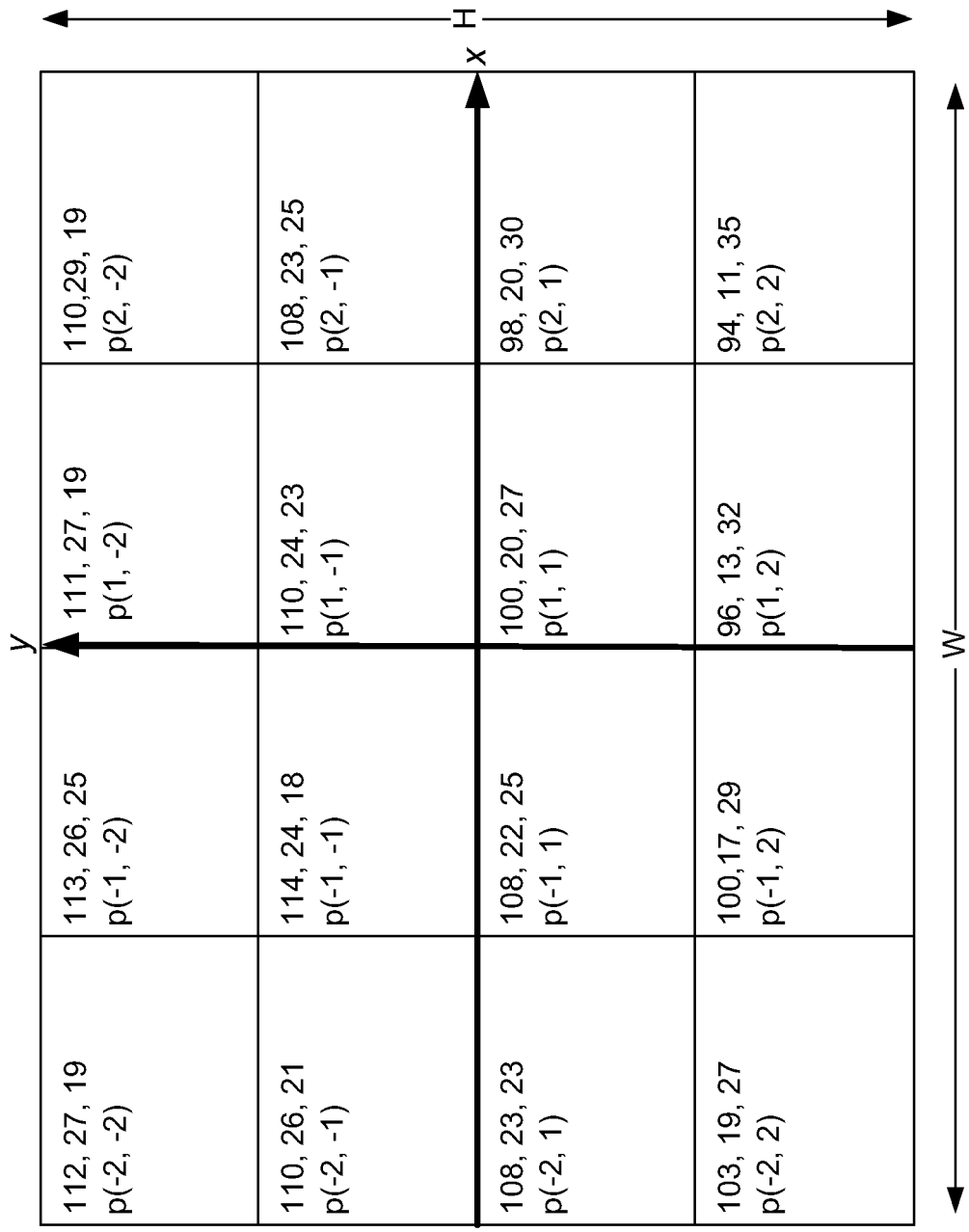
FIG. 5 is a simplified illustration depicting an exemplary frame, showing color elements and pixel coordinates for a plurality of pixels comprised in the exemplary frame, before data embedding, according to the system of FIG. 1.

Reference is now made to FIG. 5, which is a simplified illustration depicting an exemplary frame, showing color elements and pixel coordinates for a plurality of pixels comprised in the exemplary frame, before data embedding, according to the system of FIG. 1. The discussion of FIGS. 3 and 4 is provided as an example of one preferred embodiment of the present invention. It is appreciated that all values are given purely for illustrative purposes, and are in no way to be construed as limiting. For ease of depiction, the exemplary frame depicted in FIG. 5 comprises only 16 pixels. The following table tabulates various exemplary values depicted in the exemplary frame depicted in FIG. 5:

| Pixel | R | G | B |
|---|---|---|---|
| p(−2, 2) | 112 | 27 | 19 |
| p(−1, 2) | 113 | 26 | 25 |
| p(1, 2) | 111 | 27 | 19 |
| p(2, 2) | 110 | 29 | 19 |
| p(−2, 1) | 110 | 26 | 21 |
| p(−1, 1) | 114 | 24 | 18 |
| p(1, 1) | 110 | 24 | 23 |
| p(2, 1) | 108 | 23 | 25 |
| p(−2, −1) | 108 | 23 | 23 |
| p(−1, −1) | 108 | 22 | 25 |
| p(1, −1) | 100 | 20 | 27 |
| p(2, −1) | 98 | 20 | 30 |
| p(−2, −2) | 103 | 19 | 27 |
| p(−1, −2) | 100 | 17 | 29 |
| p(1, −2) | 96 | 13 | 32 |
| p(2, −2) | 94 | 11 | 35 |
|  | $R^* = \Sigma R(p) = 1695$ | $G^* = \Sigma G(p) = 351$ | $B^* = \Sigma B(p) = 397$ |

Several examples of embedding the data are now presented. Assume, for ease of depiction, a frame 3 pixels by 3 pixels. Each pixel is identified as $P_n$, and coordinates are given for each pixel:

| $P_1(-1, -1)$ | $P_2(0, -1)$ | $P_3(1, -1)$ |
|---|---|---|
| $P_4(-1, 0)$ | $P_5(0, 0)$ | $P_6(1, 0)$ |
| $P_7(-1, 1)$ | $P_8(0, 1)$ | $P_9(1, 1)$ |

As mentioned above, the top-left pixel is (−W/2, −H/2), thus, the upper half of the coordinate system uses negative values of y.

Each of the pixels $P_1$-$P_9$ comprises a RGB value, as described above. The RGB values given below are given by way of example:

| $P_1(191, 27, 0)$ | $P_2(188, 25, 220)$ | $P_3(212, 6, 194)$ |
|---|---|---|
| $P_4(123, 203, 86)$ | $P_5(212, 38, 161)$ | $P_6(35, 89, 121)$ |
| $P_7(20, 194, 19)$ | $P_8(104, 76, 199)$ | $P_9(62, 149, 131)$ |

Assuming $\omega_R = \omega_G = \omega_B = (\alpha, \beta) = (2, 0)$, and multiplying the coordinate of each pixel (x, y) by ($\alpha$, $\beta$) gives ($\alpha$*x)+($\beta$*y)= (2*x)+(0*y)=(2*x) gives a modifier to be added to each color element in each pixel:

| $P_1(-2)$ | $P_2(0)$ | $P_3(2)$ |
|---|---|---|
| $P_4(-2)$ | $P_5(0)$ | $P_6(2)$ |
| $P_7(-2)$ | $P_8(0)$ | $P_9(2)$ |

Adding the modifier to each color element of each pixel, as described above, gives:

| $P'_1(189, 25, 0)$ | $P'_2(188, 25, 220)$ | $P'_3(214, 6, 194)$ |
|---|---|---|
| $P'_4(121, 201, 84)$ | $P'_5(212, 38, 161)$ | $P'_6(37, 91, 123)$ |
| $P'_7(18, 192, 17)$ | $P'_8(104, 76, 199)$ | $P'_9(64, 151, 133)$ |

Assume, by way of a second example, a frame 5 pixels by 5 pixels:

| $P_1(209, 54, 9)$ | $P_2(144, 165, 59)$ | $P_3(97, 88, 158)$ | $P_4(112, 87, 92)$ | $P_5(35, 191, 8)$ |
|---|---|---|---|---|
| $P_6(118, 184, 246)$ | $P_7(204, 18, 51)$ | $P_8(60, 253, 35)$ | $P_9(20, 116, 54)$ | $P_{10}(111, 76, 177)$ |
| $P_{11}(137, 116, 184)$ | $P_{12}(145, 79, 254)$ | $P_{13}(254, 139, 112)$ | $P_{14}(7, 96, 68)$ | $P_{15}(151, 45, 193)$ |
| $P_{16}(142, 85, 214)$ | $P_{17}(123, 193, 146)$ | $P_{18}(64, 41, 196)$ | $P_{19}(231, 60, 231)$ | $P_{20}(69, 56, 174)$ |
| $P_{21}(53, 241, 229)$ | $P_{22}(16, 179, 88)$ | $P_{23}(22, 130, 219)$ | $P_{24}(36, 132, 117)$ | $P_{25}(174, 72, 122)$ |

Each pixel is identified as $P_n$, and coordinates are given for each pixel:

| $P_1(-2, -2)$ | $P_2(-1, -2)$ | $P_3(0, -2)$ | $P_4(1, -2)$ | $P_5(2, -2)$ |
|---|---|---|---|---|
| $P_6(-2, -1)$ | $P_7(-1, -1)$ | $P_8(0, -1)$ | $P_9(1, -1)$ | $P_{10}(2, -1)$ |
| $P_{11}(-2, 0)$ | $P_{12}(-1, 0)$ | $P_{13}(0, 0)$ | $P_{14}(1, 0)$ | $P_{15}(2, 0)$ |
| $P_{16}(-2, 1)$ | $P_{17}(-1, 1)$ | $P_{18}(0, 1)$ | $P_{19}(1, 1)$ | $P_{20}(2, 1)$ |
| $P_{21}(-2, 2)$ | $P_{22}(-1, 2)$ | $P_{23}(0, 2)$ | $P_{24}(1, 2)$ | $P_{25}(2, 2)$ |

Assuming $\omega_R = \omega_G = \omega_B = (\alpha, \beta) = (-1, 1)$, and multiplying the coordinate of each pixel (x, y) by ($\alpha$, $\beta$) gives ($\alpha$*x)+($\beta$*y)= (−1*x)+(1*y) gives a modifier to be added to each color element in each pixel:

| $P_1(2, -2) = 0$ | $P_2(1, -2) = -1$ | $P_3(0, -2) = -2$ | $P_4(-1, -2) = -3$ | $P_5(-2, -2) = -4$ |
|---|---|---|---|---|
| $P_6(2, -1) = 1$ | $P_7(1, -1) = 0$ | $P_8(0, -1) = -1$ | $P_9(-1, -1) = -2$ | $P_{10}(-2, -1) = -3$ |
| $P_{11}(2, 0) = 2$ | $P_{12}(1, 0) = 1$ | $P_{13}(0, 0) = 0$ | $P_{14}(-1, 0) = -1$ | $P_{15}(-2, 0) = -2$ |
| $P_{16}(2, 1) = 3$ | $P_{17}(1, 1) = 2$ | $P_{18}(0, 1) = 1$ | $P_{19}(-1, 1) = 0$ | $P_{20}(-2, 1) = -1$ |
| $P_{21}(2, 2) = 4$ | $P_{22}(1, 2) = 3$ | $P_{23}(0, 2) = 2$ | $P_{24}(-1, 2) = 1$ | $P_{25}(-2, 2) = 0$ |

Adding the modifier to each color element of each pixel, as described above, gives:

| $P'_1$(209, 54, 9) | $P'_2$(143, 164, 58) | $P'_3$(95, 86, 156) | $P'_4$(109, 84, 89) | $P'_5$(31, 187, 4) |
|---|---|---|---|---|
| $P'_6$(119, 185, 247) | $P'_7$(204, 18, 51) | $P'_8$(59, 252, 34) | $P'_9$(18, 114, 52) | $P'_{10}$(108, 73, 174) |
| $P'_{11}$(139, 118, 186) | $P'_{12}$(146, 80, 255) | $P'_{13}$(254, 139, 112) | $P'_{14}$(6, 95, 67) | $P'_{15}$(149, 43, 191) |
| $P'_{16}$(145, 88, 217) | $P'_{17}$(125, 195, 148) | $P'_{18}$(65, 42, 197) | $P'_{19}$(231, 60, 231) | $P'_{20}$(68, 55, 173) |
| $P'_{21}$(57, 245, 233) | $P'_{22}$(19, 182, 91) | $P'_{23}$(24, 132, 221) | $P'_{24}$(37, 133, 118) | $P'_{25}$(174, 72, 122) |

Figure 6:
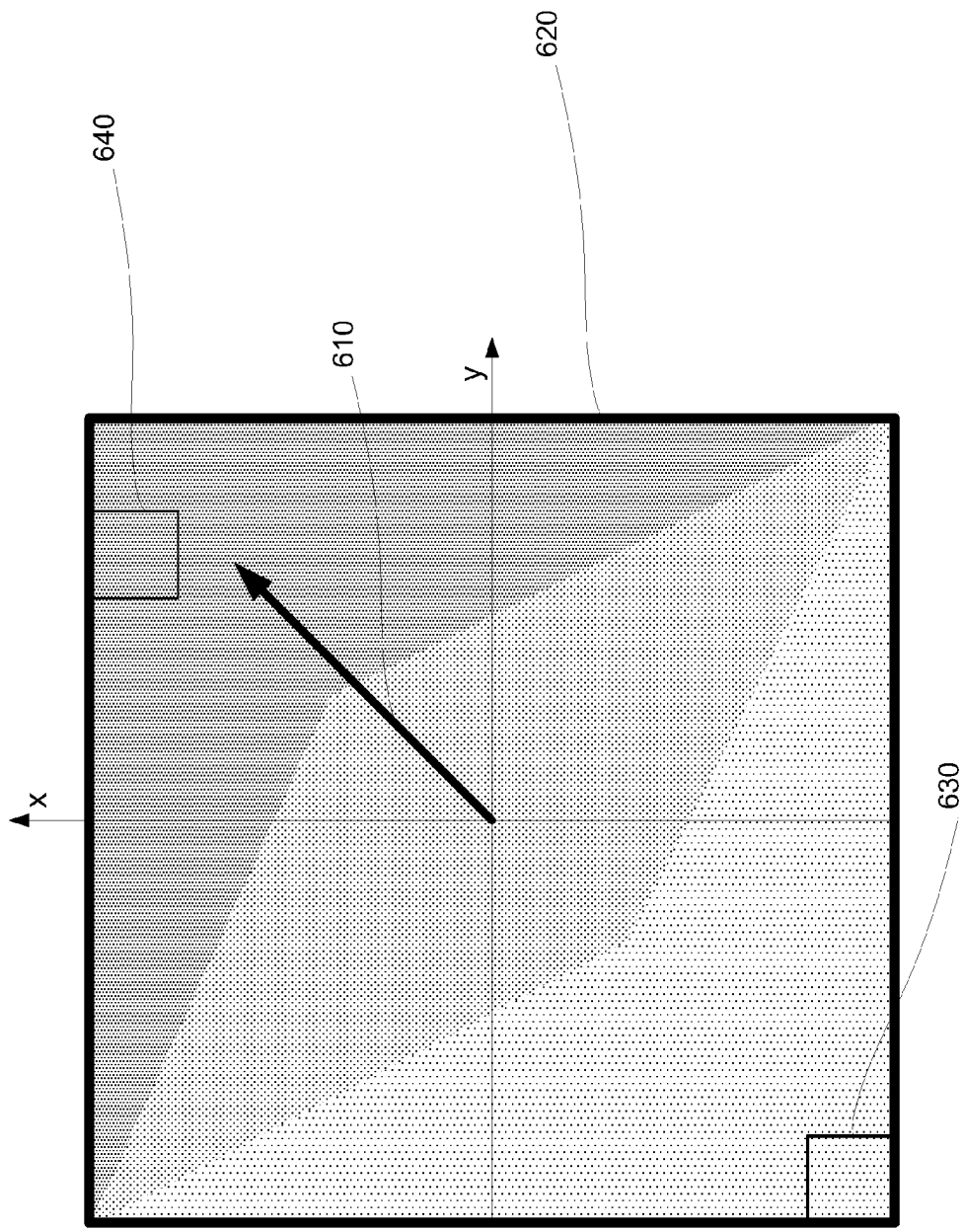
FIG. 6 is a simple depiction of a typical color gradient and a 2-coordinate vector, ω, in a frame produced by a preferred implementation of the present invention.

Reference is now made to FIG. 6 which is a simple depiction of a typical color gradient and a 2-coordinate vector, $\omega$ 610, in a frame 620 produced by a preferred implementation of the present invention. As described below, p is maximal in corners of the screen, and thus, the dot product $<p, \omega>$ is largest for maximal lengths of p. Thus, pixel 630 is depicted as substantially less dark than pixel 640. It is appreciated that $\omega$ 610, in the present example, illustrates the effect of $\omega$ 610 on any of the RGB components.

Those skilled in the art will appreciate that a video signal or other appropriate signal may comprise video comprising embedded data as described above with reference to FIGS. 1-6. Those skilled in the art will appreciate that video comprising embedded data as described above with reference to FIGS. 1-6 may be stored on a compact disk (CD), a digital versatile disk (DVD), flash memory, or other appropriate storage medium.

Detection of the embedded data is now described. For ease of description, the following description focuses on a red color component only. It is appreciated that detection of the embedded data in other color components is identical to detection in the red color component. The detection device 90 (FIG. 1) receives the content 60, typically from a content sharing network 70.

In the following summations, all summations are over all pixels in a frame under examination, unless otherwise specified.

As mentioned above, color mass, for component R before data is embedded in a given frame is denoted $R^* = \Sigma R(p)$. The sum $R^* = \Sigma R(p)$ is the sum of all values of a single color element in each pixel in a single frame.

It is appreciated that the color mass, after data is embedded in a frame, remains the same:

$$\Sigma R'(p) = \Sigma R(p) + <\Sigma p, \omega_R> = \Sigma R(p) + 0 = R^*.$$

Those skilled in the art will appreciate that the dot product, $<\Sigma p, \omega_R> = 0$, since for each pixel $p=(x,y)$, there is a corresponding pixel $-p=(-x,-y)$. And thus, for every summand in $\Sigma<p, \omega>$, there exists an equal summand of opposite sign.

Let C' denote a color mass center for a frame comprising embedded data. Thus, for the red component, the color mass center for the frame is defined as a normalized two-dimensional vector:

$$C'(R) = \frac{\sum R'(p)^* p}{R^*}$$

By subtraction, a difference between the color mass center of the frame after data has been embedded and the color mass center of an original frame is determined:

$$D(R) = \frac{\sum R'(p)^* p}{\sum R'(p)} - \frac{\sum R(p)^* p}{\sum R(p)}$$

$$= \frac{\sum R(p)^* p + \sum p <p, \omega_R> - \sum R(p)^* p}{R^*}$$

$$= \frac{\sum <p, \omega_R>^* p}{R^*}$$

Since $p=(x,y)$ and $\omega_R=(\alpha, \beta)$, $$\sum <p, \omega_R>^* p = \left(\sum x^*(\alpha x + \beta y), \sum y^*(\alpha x + \beta y)\right)$$

$$= \left(\sum x^*(\alpha x + \beta y), \sum y^*(\alpha x + \beta y)\right).$$

Opening the parentheses and eliminating zero-valued summands:

$$\Sigma x(\alpha x + \beta y) = \alpha \Sigma x^2 + \beta \Sigma xy, \text{ and}$$

$$\beta \Sigma xy = \beta \Sigma x \Sigma y = 0.$$

Thus, $$\alpha \sum x^2 \approx 2 * \frac{1}{3}\left(\frac{W}{2}\right)^3 * H = \frac{HW^3}{12}$$

Using the formula for power sums:

$$\sum_{k=0}^{n} k^2 = \frac{2n^3 + 3n^2 + n}{6}$$

The following exact and approximated equations can be derived from the above equations:

$$\alpha \sum_{\substack{x=0 \ldots W/2 \\ y=0 \ldots H/2}} x^2 = \alpha \sum_{x=0}^{W/2} \frac{H}{2} x^2$$

$$= \alpha \frac{H}{2} * \frac{2(W/2)^3 + 3(W/2)^2 + W/2}{6} \approx \frac{\alpha HW^3}{12}$$

$$\beta \sum_{\substack{x=0 \ldots W/2 \\ y=0 \ldots H/2}} y^2 = \beta \sum_{y=0}^{H/2} \frac{W}{2} y^2$$

$$= \beta \frac{W}{2} * \frac{2(H/2)^3 + 3(H/2)^2 + H/2}{6} \approx \frac{\beta WH^3}{12}$$

Therefore:

$$D(R) \approx \frac{HW}{12R^*} * (\alpha W^2, \beta H^2),$$

Extracting α and β from the approximated equation:

$$\alpha \approx D(R)\frac{12R*}{HW^3}*(1,0)$$

$$\beta \approx D(R)\frac{12R*}{H^3W}*(0,1)$$

The approximated expressions are used above for clarity of description. Those skilled in the art will appreciate that exact equations should be used in the actual process of extraction of embedded data in place of approximations.

To ensure that viewing experience is not harmed, ω's are preferably chosen so that color component modification will not exceed a certain threshold. It is the opinion of the inventors of the present invention that the recommended threshold value is 2%, or about 4 on the scale from 0 to 255. Because the dot product <p,w> is linear, the dot product <p,w> is largest for maximal lengths of p. Specifically, p is maximal in corners of the screen. Accordingly, applying the following constraint preferably serves to limit the upper bound, thereby ensuring that the threshold not exceed 2%, with regard to the scale of 0-255:

$$\alpha H/2+\beta W/2<(2/100)*255$$

It is the opinion of the inventors of the present invention that the color mass frequency data embedding technique described herein is highly resistant to known attacks. Specifically:

Filtering—the present invention, in preferred embodiments thereof has very little effect on the image and video frequency domain, typically on extremely low frequencies, or not at all. Therefore, the proposed WM technique cannot be detected or removed using standard low-pass filters, video color balance tools, etc, that target noise and signals at high frequencies.

Resizing (stretching), rotation, and cropping—Stretching or rotating the video comprising the embedded data is expected to cause a linear change in the values of α and β in the encoded data, since, informally, α and β are the coordinates of a vector that is overlaid on the screen. Furthermore, it is possible to choose an encoding method that avoids resizing (stretching), rotation, and cropping attacks, for example and without limiting the generality of the foregoing, by choosing the set of vectors ω so that the minimum angle between any two possible vectors is significantly greater than the maximum rotation resulting from an attack.

Collusion attacks—collusion attacks typically work by averaging several video signals comprising WMs, or choosing each frame out of several frames comprising WMs, thereby resulting in a WM that combines data from all originally examined signals. In particular, a frequency analysis of the combined signal typically reveals all injected frequencies. If the data embedding system 20 (FIG. 1) pauses between injections of separate bytes, as described above, then the resulting signal preferably contains intervals when only one of the original WMs is present, thereby allowing signal separation. Standard error-correction techniques, well known in the art, used both at injection and at detection, preferably are utilized in order to assist in separating the WMs.

Cropping—cropping video comprising embedded data may cause loss of color information, and consequently change the values of α and β in the encoded data. A change in the values of α and β will be proportional to a drop in perceived video quality and similarity to quality of an original video.

Collusion attacks: averaging—a collusion attack by averaging several video signals comprising the embedded data will typically result in a WM that combines data from all of the averaged original signals. A resulting α and β will be an average of all the originally averaged α's and β's. The present invention, in preferred embodiment thereof, preferably prevents loss of information, for example, and without limiting the generality of the foregoing, by turning on embedding of data for random time spans at every injector.

Collusion attacks: selection—a collusion attack by choosing different frames from different video signals comprising embedded data will result in a WM that carries data from all of the originally selected signals. A resulting α and β will identify each one of the participating sources, separately. In other words, a selection attack is useless.

Figure 8:
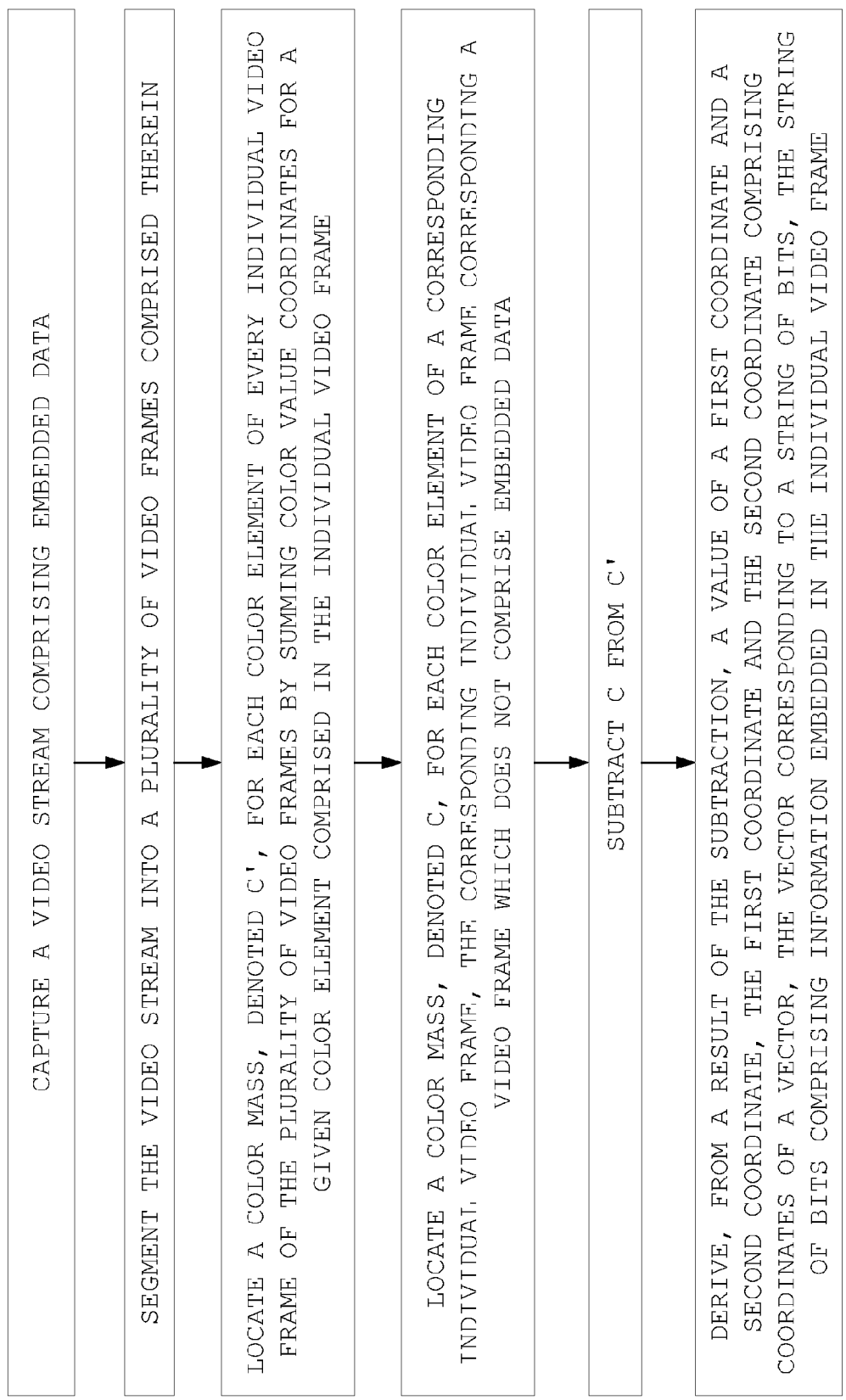

Reference is now made to FIGS. 7-8, which are simplified flowcharts of preferred methods of operation of the system of FIG. 1. FIGS. 7-8 are believed to be self-explanatory in light of the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method comprising:

at a marking information receiver, receiving marking information;

at a processor, representing the marking information as a 2-coordinate vector, denoted ω, where the 2-coordinates are denoted, respectively, α, β, such that ω=(α, β);

providing a video frame to be marked, the video frame comprising a plurality of pixels, each pixel of the plurality of pixels being represented as p, where p=(x, y), x and y comprising coordinates of pixel p, the plurality of pixels being represented as a triad of color elements, denoted, respectively, as R, G, and B; and at a video frame marker, marking the video frame by transforming each pixel among the plurality of pixels as follows:

$$R'(p)=R(p)+<p,\omega_R>;$$

$$G'(p)=G(p)+<p,\omega_G>;\text{ and}$$

$$B'(p)=B(p)+<p,\omega_B>,$$

where:

<p, $\omega_R$> represents a dot product operation on p and $\omega_R$;
<p, $\omega_G$> represents a dot product operation on p and $\omega_G$; and
<p, $\omega_B$> represents a dot product operation on p and $\omega_B$, wherein R(p), G(p) and B(p), respectively, are pixel p's original red, green, and blue component, and R'(p), G'(p) and B'(p) respectively, are pixel p's red, green, and blue component after data marking, and ω equals information to inject, represented as a 2-coordinate vector (α, β).

2. The method according to claim 1 and wherein the marking information comprises information identifying a rendering device.

3. The method according to claim 2 and wherein the information identifying a rendering device comprises a unique device identifier.

4. The method according to claim 1 and wherein the marking information comprises a copyright mark.

5. The method according to claim 1 and wherein the marking information comprises access rights data.

6. The method according to claim 5 and wherein the access rights data comprise playback/copying permission.

7. The method according to claim 1 and wherein the at least one color element comprises a Red-Green-Blue color element.

8. The method according to claim 1 and wherein the at least one color element comprises a chrominance/luminance color element.

9. The method according to claim 8 and wherein the chrominance/luminance color element comprises a YCbCr chrominance/luminance color element.

10. The method according to claim 8 and wherein the chrominance/luminance color element comprises a YPbPr chrominance/luminance color element.

11. The method according to claim 8 and wherein the chrominance/luminance color element comprises a YDbDr chrominance/luminance color element.

12. The method according to claim 8 and wherein the chrominance/luminance color element comprises a xvYCC chrominance/luminance color element.

13. The method according to claim 1 and wherein R'(p), G'(p), and B'(p) do not exceed a maximum value allowed for each said color element in a color representation system.

14. The method according to claim 13 and wherein any of R'(p), G'(p), and B'(p) are truncated to ensure that any of R'(p), G'(p), and B'(p) do not exceed the maximum value.

15. The method according to claim 13 and wherein the color representation system comprises a Red-Green-Blue color representation system.

16. The method according to claim 13 and wherein the color representation system comprises a chrominance/luminance color representation system.

17. The method according to claim 1 and wherein R'(p), G'(p), and B'(p) do not fall below a minimum value allowed for each said color element in a color representation system.

18. The method according to claim 17 and wherein any of R'(p), G'(p), and B'(p) are truncated to ensure that any of R'(p), G'(p), and B'(p) do not exceed the minimum value.

19. The method according to claim 17 and wherein the color representation system comprises a Red-Green-Blue color representation system.

20. The method according to claim 17 and wherein the color representation system comprises a chrominance/luminance color representation system.

21. The method according to claim 1 and wherein the representing the marking information as a 2-coordinate vector comprises:
- expressing the marking information as a string of bits;
- subdividing the string of bits into a plurality of sub-strings of bits; and
- translating the each one of the plurality of sub-strings of bits into a corresponding 2-coordinate vector.

22. The method according to claim 21 and wherein each one of the plurality of sub-strings of bits comprises a three bit string of bits.

23. The method according to claim 21 and wherein each one of the plurality of sub-strings of bits comprises a two bit string of bits.

24. A system comprising:
- a marking information receiver receiving at a processor a 2-coordinate vector;
- the 2-coordinate vector, denoted $\omega$, where the 2-coordinates are denoted, respectively, $\alpha, \beta$, such that $\omega=(\alpha, \beta)$, the 2-coordinate vector representing the marking information;
- a video frame to be marked, the video frame comprising a plurality of pixels, each pixel of the plurality of pixels being represented as p, where p=(x, y), x and y comprising coordinates of pixel p, the plurality of pixels being represented as a triad of color elements, denoted, respectively, as R, G, and B; and
- a video frame marker operative to mark the video frame by transforming each pixel among the plurality of pixels as follows:

$$R'(p)=R(p)+<p,\omega_R>;$$

$$G'(p)=G(p)+<p,\omega_G>; \text{ and}$$

$$B'(p)=B(p)+<p,\omega_B>,$$

where:
- $<p, \omega_R>$ represents a dot product operation on p and $\omega_R$;
- $<p, \omega_G>$ represents a dot product operation on p and $\omega_G$; and
- $<p, \omega_B>$ represents a dot product operation on p and $\omega_B$, wherein R(p), G(p) and B(p), respectively, are pixel p's original red, green, and blue component, and R'(p), G'(p) and B'(p) respectively, are pixel p's red, green, and blue component after data marking, and $\omega$ equals information to inject, represented as a 2-coordinate vector ($\alpha, \beta$).

25. A non-transitory computer storage medium, storing software to implement receiving a video stream, comprising:
- a video stream comprising a plurality of video frames, each of the plurality of video frames comprising a plurality of pixels, each pixel of the plurality of pixels being represented as p, where p=(x, y), x and y comprising coordinates of pixel p, the plurality of pixels being represented as a triad of color elements, denoted, respectively, as R, G, and B, wherein:
- marking information has been utilized to transform each pixel among the plurality of pixels, the marking information represented as a 2-coordinate vector, denoted $\omega$, where the 2-coordinates are denoted, respectively, $\alpha, \beta$, such that $\omega=(\alpha, \beta)$, as follows:

$$R'(p)=R(p)+<p,\omega_R>;$$

$$G'(p)=G(p)+<p,\omega_G>; \text{ and}$$

$$B'(p)=B(p)+<p,\omega_B>,$$

where:
- $<p, \omega_R>$ represents a dot product operation on p and $\omega_R$;
- $<p, \omega_G>$ represents a dot product operation on p and $\omega_G$; and
- $<p, \omega_B>$ represents a dot product operation on p and $\omega_B$, wherein R(p), G(p) and B(p), respectively, are pixel p's original red, green, and blue component, and R'(p), G'(p) and B'(p) respectively, are pixel p's red, green, and blue component after data marking, and ω equals information to inject, represented as a 2-coordinate vector $(\alpha, \beta)$.

26. A system comprising:
means for receiving marking information;
means for representing the marking information as a 2-coordinate vector, denoted ω, where the 2-coordinates are denoted, respectively, $\alpha$, $\beta$, such that $\omega=(\alpha, \beta)$;
means for providing a video frame to be marked, the video frame comprising a plurality of pixels, each pixel of the plurality of pixels being represented as p, where p=(x, y), x and y comprising coordinates of pixel p, the plurality of pixels being represented as a triad of color elements, denoted, respectively, as R, G, and B; and
means for marking the video frame by transforming each pixel among the plurality of pixels as follows:

$$R'(p)=R(p)+<p,\omega_R>;$$

$$G'(p)=G(p)+<p,\omega_G>; \text{ and}$$

$$B'(p)=B(p)+<p,\omega_B>,$$

where:
$<p, \omega_R>$ represents a dot product operation on p and $\omega_R$;
$<p, \omega_G>$ represents a dot product operation on p and $\omega_G$; and
$<p, \omega_B>$ represents a dot product operation on p and $\omega_B$,
wherein R(p), G(p) and B(p), respectively, are pixel p's original red, green, and blue component, and R'(p), G'(p) and B'(p) respectively, are pixel p's red, green, and blue component after data marking, and ω equals information to inject, represented as a 2-coordinate vector $(\alpha, \beta)$.

* * * * *